(12) United States Patent
Camarasa

(10) Patent No.: US 9,108,750 B2
(45) Date of Patent: Aug. 18, 2015

(54) MODULAR DEVICE FOR MULTI-AXIAL INSULATION AGAINST VIBRATION AND IMPACTS, BASED ON ELASTOMER

(75) Inventor: Patrick Camarasa, Rebigue (FR)

(73) Assignee: Airbus Defence and Space SAS, Les Mureaux (FR)

( * ) Notice: Subject to any disclaimer, the term of this patent is extended or adjusted under 35 U.S.C. 154(b) by 921 days.

(21) Appl. No.: 12/743,934

(22) PCT Filed: Oct. 24, 2008

(86) PCT No.: PCT/FR2008/051928
§ 371 (c)(1),
(2), (4) Date: Jun. 22, 2010

(87) PCT Pub. No.: WO2009/066045
PCT Pub. Date: May 28, 2009

(65) Prior Publication Data
US 2010/0264290 A1    Oct. 21, 2010

(30) Foreign Application Priority Data
Nov. 22, 2007   (FR) ...................................... 07 08197

(51) Int. Cl.
*B64G 1/00*       (2006.01)
*F16F 7/00*       (2006.01)
(Continued)

(52) U.S. Cl.
CPC ................ *B64G 1/283* (2013.01); *B64G 1/286* (2013.01); *B64G 1/38* (2013.01)

(58) Field of Classification Search
CPC ............. F16F 7/00; F16F 15/04; F16F 1/025; B64G 1/641; B64G 1/10; B64G 1/283; B64G 1/286; B64G 1/38

USPC .............. 244/173.2, 158.1; 267/34, 136, 154, 267/195
See application file for complete search history.

(56) References Cited

U.S. PATENT DOCUMENTS 5,305,981 A    4/1994   Cunnigham et al.
5,379,990 A *  1/1995   Ando et al. ...................... 267/34
(Continued)

FOREIGN PATENT DOCUMENTS

EP    0 539 930     5/1993
EP    0 848 186     6/1998
(Continued)

OTHER PUBLICATIONS

Japanese Office Action for related Japanese Application No. 2010-534520; action dated Nov. 1, 2012.
(Continued)

*Primary Examiner* — Valentina Xavier
(74) *Attorney, Agent, or Firm* — Miller, Matthias & Hull LLP

(57) ABSTRACT

The invention related to a device comprising at least three insulation modules distributed around vibration equipment. Each module comprises at least two rigid parts, at least one of said parts being an outer part fixed to the carrier structure and at least one of said parts being an inner part fixed to the equipment or the stand (3) thereof. At least one elastomer insulating plug connects an inner part and an outer part and at least one of said parts carries two longitudinal flexible abutments and two tangential flexible abutments which each have a free end facing another respectively outer or inner rigid part, said free end being at a distance from the inner part in an idle position. The invention can be applied to satellite equipment.

24 Claims, 6 Drawing Sheets

(51) Int. Cl.
*F16F 13/00* (2006.01)
*B64G 1/28* (2006.01)
*B64G 1/38* (2006.01)

(56) References Cited

U.S. PATENT DOCUMENTS

| | | | | |
|---|---|---|---|---|
| 5,971,375 | A * | 10/1999 | Simonian et al. | 267/136 |
| 6,588,533 | B2 | 7/2003 | Larmande et al. | |
| 6,671,124 | B2 * | 12/2003 | Guion et al. | 360/97.19 |
| 7,384,029 | B2 * | 6/2008 | Itakura | 267/153 |
| 2003/0048743 | A1 * | 3/2003 | Guion et al. | 369/263 |
| 2004/0139803 | A1 * | 7/2004 | Robinson et al. | 73/650 |
| 2009/0008504 | A1 * | 1/2009 | Camarasa | 244/173.2 |

FOREIGN PATENT DOCUMENTS

| | | |
|---|---|---|
| EP | 11-55894 B1 | 7/2003 |
| JP | 46-24334 | 7/1971 |
| JP | 51-110189 | 3/1975 |
| JP | 55-62421 | 10/1980 |
| JP | 62-016843 | 1/1987 |
| JP | 64-003140 | 1/1989 |
| JP | 02-81284 | 6/1990 |
| JP | 03-102323 | 10/1991 |
| JP | H4-114141 | 10/1992 |
| JP | 7-280035 | 10/1995 |
| JP | 08-312719 | 11/1996 |
| JP | 09-177372 | 7/1997 |
| JP | 11-325145 | 11/1999 |
| JP | 2001 140984 | 5/2001 |
| JP | 2001-289280 | 10/2001 |
| WO | WO 2007/077350 | 7/2007 |

OTHER PUBLICATIONS

International Search Report from counterpart application No. PCT/FR2008/051928; Report dated May 8, 2009.
French Preliminary Search Report from priority application FR 0708197; Report dated Jun. 9, 2008.
Canadian Office Action for related Canadian Application No. FR2008-051928; action dated Apr. 8, 2014.
Korean Office Action Patent Application No. 10-2010-7012970; reported on Oct. 6, 2014.

* cited by examiner

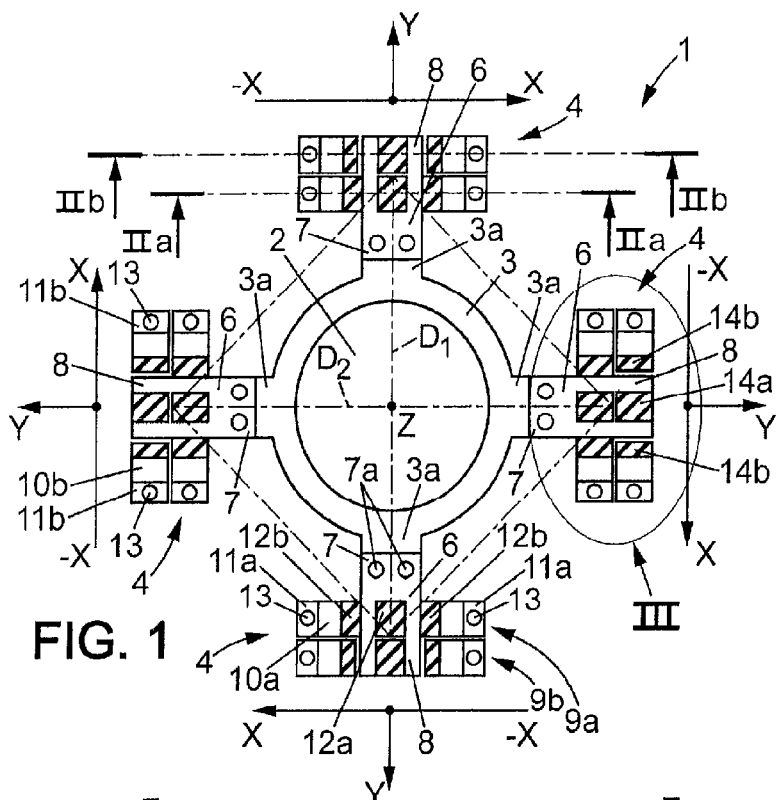
FIG. 1
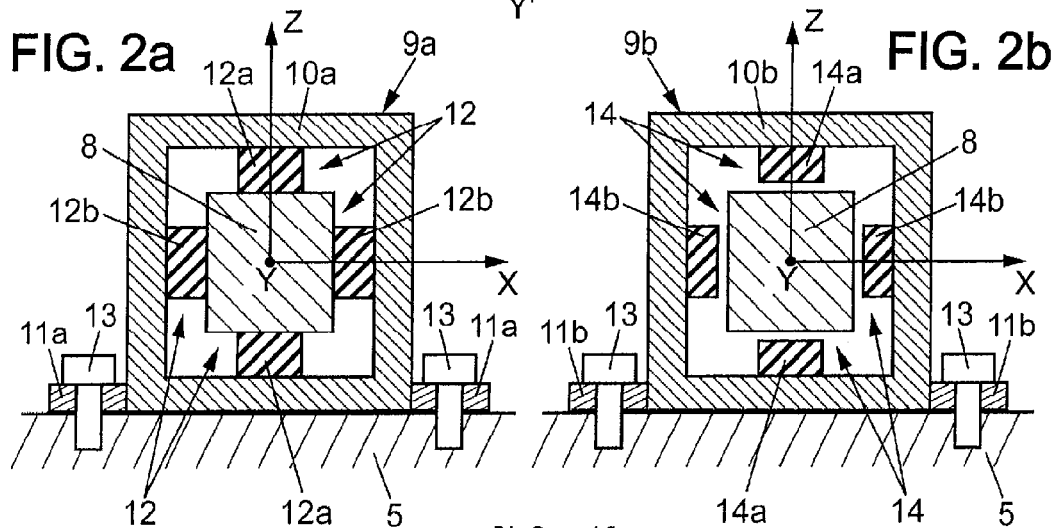
FIG. 2a
FIG. 2b
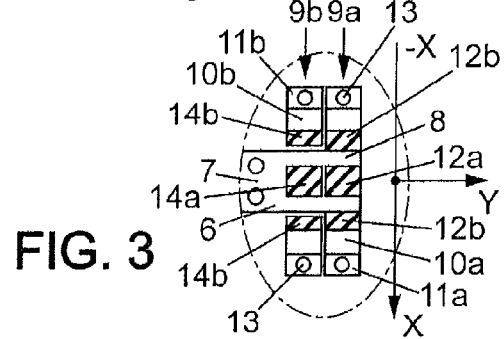
FIG. 3

MODULAR DEVICE FOR MULTI-AXIAL INSULATION AGAINST VIBRATION AND IMPACTS, BASED ON ELASTOMER

CROSS-REFERENCE TO RELATED APPLICATIONS

This application is a U.S. national stage filing of International Patent Application No. PCT/FR2008/051928 filed on Oct. 24, 2008, which claims priority under the Paris Convention to French Patent Application No. 07 08197, filed on Nov. 22, 2007.

FIELD OF THE DISCLOSURE

The present invention relates to a device for multi-axis insulation of the vibrations generated by an item of vibrating equipment and transmitted to a carrying structure of this equipment, such as, for example, in the case in which the item of vibrating equipment comprises at least one element that is rotating and/or moved in periodic translation, the term insulation having to be understood in the sense of at least one attenuation by elements placed in series between the source of vibrations, which is the item of vibrating equipment, and the support to be isolated, which is the carrying structure.

BACKGROUND OF THE DISCLOSURE

The insulation device must also, in certain cases, fulfill another function, a priori antagonistic to that presented above, and which is to attenuate dynamic loads, such as vibrations and impacts, that are considerable and transitory, applied to the carrying structure, and being propagated through the insulation device to the item of equipment, which may be sensitive to these loads.

In order to make the invention easier to understand, the latter is described below more particularly in the context of certain applications associated with the space sector, and for which the present invention is of particular value for the Applicant.

It is well known that certain actuators, widely used for controlling the attitude of satellites, have one or more rotating elements, the balancing of which, always imperfect in practice, generates vibrations that are propagated through the structure of the satellite. It is the case, for example, with reaction wheels, kinetic wheels, momentum wheels, gyrodynes (also called gyroscopic actuators or CMG in the literature), energy storage wheels, etc.

Other items of equipment on board satellites can also generate such vibrations, such as for example compressor-based coolers.

The vibrations created by these items of equipment can be transmitted to the payloads of the satellites and damage their performance, as is the case, for example, for optical observation instruments that are particularly sensitive to movements of the line of sight that are harmful to the quality of the images obtained.

In order to counter these harmful effects, according to the prior art, the disruptive item of equipment or a set of disruptive items of equipment is mounted on an insulation device consisting of an interface for mounting the item of equipment or set of equipment onto the carrying structure. In addition to this mounting function, the insulation device must attenuate the transmission of the vibrations generated by at least one item of equipment according to a certain frequency template dependent on use. If at least one item of equipment is an actuator in torque or in force, the insulation device must also transmit the effective torques or forces generated by this item of equipment according to a frequency template of transmissibility also specified by the user. Moreover, it is desirable, if not necessary, also that the insulation device attenuates the very high dynamic loads applied to the carrying structure during the launch phase of the satellite, which seems to contradict the function of insulation of the vibrations of at least one item of equipment, these vibrations being several orders of magnitude lower than the dynamic loads on launch.

The insulation device according to the invention must therefore operate:
- on the ground, in particular during the performance tests and the qualification tests carried out before the launch of the satellite,
- during the launch of the satellite, in particularly difficult vibratory, acoustic and impact environments, and
- when the satellite is in orbit, where the performance of insulating very small vibrations must achieve the expected levels.

Finally, the insulation device according to the invention must also sometimes maintain over time a certain stability of alignment of the item or items of vibrating equipment relative to the carrying structure.

The following numerical values correspond to a typical operating range of a particular embodiment of the device of the invention when it is applied to the insulation of actuators such as reaction wheels or gyrodynes on board satellites:
- the weight of an item of vibrating equipment to be insulated: typically from 1 kg to 30 kg;
- disruptive forces and torques generated by the vibrating equipment: 1 N to 100 N over a frequency range from 10 Hz to 1000 Hz;
- attenuation factor sought in vibrations and impacts: 3 to 50 in the range 10 Hz to 1000 Hz (typically an attenuation in gradient −2 in logarithmic scale in the frequency domain);
- factor of overstretch of the insulation device: less than 2;
- factor of transmissibility sought: 1±5% in the range 0 to 10 Hz;
- stability of alignment over time: able to go typically to 0.05°;
- environment at launch: typically 20 to 100 g in the range 10-100 Hz (vibrations) and 1000 g in the range 100-1000 Hz (impacts) (g being the acceleration of the field of gravity of the earth).

At this point in the descriptive specification, it should be noted that the device proposed by the invention and that is presented below may also be used to insulate not a single item of equipment, but, for example, a set of items of equipments at least one of which is disruptive because it vibrates, all mounted on one and the same equipment-holding table. The insulation device according to the invention may also be used as an interface and be used to insulate a portion of a satellite, for example a service module, from another portion of the satellite, for example a payload. In these two cases, the above numerical values, given as an indication, are not necessarily applicable.

Through WO 2007/077350 from the applicant, multi-axis devices are known for insulating at least one item of vibration-generating equipment on board a carrying structure and which comprises at least three, and typically four insulation modules distributed on the periphery of said item of vibrating equipment or of a support of the latter, and such that each insulation module comprises two rigid parts of which one, called the outer part, is designed to be attached to the carrying structure, and the other, called the inner part, is designed to be attached to said item of vibrating equipment or to its support, said inner and outer parts being connected to one another by at least one elastomer insulation pad, attenuating through its deformation on at least one of its axes in tension, compression or shearing, the transmission of low-amplitude vibrations generated by said item of equipment, each insulation module also comprising a lateral (or radial) flexible abutment, and two longitudinal flexible abutments, active in opposite directions, each flexible abutment being mounted on only one of the inner and outer parts, and having a free end facing the other of said inner and outer parts and without contact with said other part at rest.

In order to clearly specify the terms used in this descriptive specification, the reader is referred to the appended FIGS. 1 to 3 and 6 to 8, in which the directions called "longitudinal" Z, "radial" Y and "tangential" X, associated with each orientation module are represented. These directions X, Y, Z are oriented respectively:

for the longitudinal direction Z: on an axis −ZZ called longitudinal of the item of vibrating equipment, because it is substantially perpendicular to its support and/or to the carrying structure, for the radial direction Y: on an axis −YY called radial, perpendicular to the longitudinal direction Z and passing through a geometric center or center of symmetry of the item of equipment to be insulated, for the tangential direction X: on an axis −XX called tangential, perpendicular to the two directions Z and Y.

The flexible abutments of the insulation modules each comprise at least one elastomer element coming into contact with said other rigid part facing it, in the active position of the flexible abutment, during deformations of sufficient amplitude of the insulation pad or pads so that the elastomer element of the flexible abutment works in compression when the abutment is active.

However, this type of embodiment of elastomer insulators according to WO 2007/077350 has a number of limitations.

On the one hand, when the abutments are not active, that is to say during the nominal operating mode of the insulation device, the stiffness in torsion (that is to say about the longitudinal axis Z) of the whole of the insulation device relies only on the shearing stiffness of the insulation pads which are placed in the longitudinal direction Z, and/or in the radial direction Y. This shearing stiffness of the pads is usually much weaker than the stiffness of the pads in tension/compression, and, in certain cases, it is insufficient to withstand the effective stresses that must be transmitted by the item of equipment in torsion in the longitudinal direction Z.

Another limitation comes from the fact that, in the configurations according to the prior art, the torsion modes are not decoupled well in frequency relative to the tilting modes (in the radial direction Y and tangential direction X).

The problem at the basis of the invention is to propose a device for the multi-axis insulation of at least one item of equipment generating vibrations, on board a carrying structure, such as a satellite, similar to those presented above and which remedies the aforementioned drawbacks of the prior art and is more suitable for the various requirements of practice than the known devices, in particular according to WO 2007/077350 aforementioned.

SUMMARY OF THE DISCLOSURE

The object of the present invention is therefore to provide simple solutions to the known limitations of the prior art.

In order to remedy these limitations, the present invention proposes a device comprising at least three insulation modules distributed on the periphery of said item of vibrating equipment or of a support of the latter, each insulation module comprising at least two rigid parts of which at least one, called the outer part, is designed to be attached to the carrying structure, and of which at least one other, called the inner part, is designed to be attached to said item of vibrating equipment or to its support, at least one inner part and at least one outer part being connected to one another by at least one elastomer insulation pad attenuating by its deformation the transmission of low-amplitude vibrations generated by said item of equipment, each module also comprising at least two flexible abutments mounted on at least one inner part or at least one outer part, and each having a free end facing another respectively outer or inner part and without contact with said other part at rest, each of said at least two flexible abutments acting on at least one axis of deformation of said at least one insulation pad, and two of the flexible abutments, called longitudinal, being active on the longitudinal axis, in opposite directions, and which is characterized in that each insulation module also comprises two flexible abutments, called tangential, active on the tangential axis, in opposite directions. Thus, each module does not necessarily comprise flexible abutments on the radial axis, as is necessary in WO 2007/007350.

As in WO 2007/077350, the flexible abutments of the insulation modules each advantageously comprise at least one elastomer element coming into contact with said other rigid part facing it, in the active position of the corresponding flexible abutment.

Therefore, in a particular embodiment of flexible abutment, the elastomer element of at least one flexible abutment of at least one insulation module has a free end facing said other outer or inner part, and without contact at rest with said other part, which comprises a portion facing said elastomer element and consisting of a metal boss of said other part.

But, in another particular embodiment of flexible abutment, the latter, on at least one module, may comprise a rigid portion that consists of a metal boss of the part of the module supporting the abutment, this boss supporting the elastomer element of the abutment.

Advantageously, for a better insulation in the tangential direction and the longitudinal direction, at least one insulation module, but preferably each of them, comprises at least one insulation pad called tangential, mounted substantially on the tangential axis and/or at least one insulation pad called longitudinal, mounted substantially on the longitudinal axis.

But moreover, for a better insulation in the two opposite directions in the longitudinal direction and the tangential direction, at least one insulation module, but preferably each of them, comprises two longitudinal insulation pads, preferably identical, mounted substantially symmetrically on either side of an inner part of said module on the longitudinal axis, and/or two tangential insulation pads, preferably identical, mounted substantially symmetrically on either side of an inner part of said module on the tangential axis.

For a balanced behavior of the device, in the two opposite directions in the longitudinal direction and in the tangential direction, to the major movements, it is also advantageous, on at least one module, and preferably on each of them, that the two longitudinal flexible abutments, preferably identical, are mounted substantially symmetrically on either side of an inner part on the longitudinal axis, and that the two tangential flexible abutments, preferably identical, are mounted substantially symmetrically on either side of an inner part on the tangential axis.

Moreover, in order to simplify the structure of the devices according to the invention and to reduce the production cost thereof, all of the flexible abutments of at least one module, and preferably of each of them, advantageously consist of a single elastomer element, attached to one of the inner and outer rigid parts, facing one another, respectively outer or inner, rigid part.

But, yet more advantageously, all of the pads and flexible abutments of at least one module, and preferably of each of them, consist of a single elastomer element.

In a first embodiment facilitating the interchangeability of the flexible abutments, in order to improve the adaptation of the device to its application, at least one module, and preferably each of them, comprises two outer rigid parts, one of which supports all the flexible abutments, and the other is linked via said at least one insulation pad to the or one inner rigid part of said module, the flexible portion of said flexible abutments being attached either to the inner face of said outer rigid part supporting all the flexible abutments, or to the outer face of the or one inner rigid part.

Advantageously in this case, the outer part supporting the flexible abutments is removably attached to said carrying structure, in the outer radial position relative to the other outer part of said module.

This makes it possible to remove only said outer part supporting the flexible abutments and to replace it with another outer part supporting other flexible abutments without having to remove other parts, in particular those supporting the insulation pad or pads of the device.

In a second embodiment, also facilitating the interchangeability of the flexible abutments, on at least one module, and preferably on each of them, a first inner part is attached to said item of vibrating equipment or to its support, and linked via said at least one insulation pad to the or one outer part of said module, and all the flexible abutments are supported by a second inner part attached in a removable and positionally adjustable manner to said first inner part. It is therefore sufficient to replace the second inner part and the flexible abutments that it supports with another second part with other flexible abutments in order to improve the adaptation of the device to its application, the flexible portion of said flexible abutments being attached either to the inner face of the or one outer part, or to the outer face of said second inner rigid part.

In this second embodiment, the flexible abutments are advantageously supported on or about the outer radial end of said second inner part arranged as a radial end-piece which partially fits, removably and with a radial adjustment, in said first inner part linked via said at least one pad to a frame of the or of the only outer part in which said first and second inner parts are radially engaged. This embodiment thus has a structure that is simple and economical to produce and to install.

In a third embodiment of again more simplified structure and more economical to produce, on at least one module, and preferably on each of them, the flexible portions of the flexible abutments are attached to one and the same inner part and consist of a single elastomer element, with a section that is for example quadrangular or circular, attached to or about an outer radial end portion, with a shape that is generally respectively parallelepipedal or cylindrical, of said inner part and engaged, without contact at rest, in a frame of matching shape of at least one outer part.

But, according to another variant embodiment, on at least one module, and preferably on each of them, the flexible portions of the flexible abutments are attached to one and the same outer part and consist of a single elastomer element in the shape of a sleeve with a section that is for example quadrangular or cylindrical attached via its outer face to the inside of a frame of said outer part, and surrounding, without contact at rest, a rigid abutment of matching shape mounted on a radial end-piece of an inner part, protruding radially outward and engaged in the frame of the outer part.

In this other variant, the rigid abutment may, advantageously, be interchangeable and have a substantially parallelepipedal or cylindrical shape and be attached, preferably in a removable and adjustable manner, to the outer radial end of the radial end-piece of the inner part, in order to make it possible to easily adjust the functional interstice between the rest and active positions of the flexible abutments.

As in WO 2007/077350, it is possible that each of the insulation modules of a device is such that its radial axis is inclined at one and the same angle relative to the plane of installation of the item of vibrating equipment on an equipment-holding table to which the inner parts of said modules are secured. In this case, the term "longitudinal" no longer indicates the perpendicular to the plane of installation of the item of equipment but a direction inclined on this plane of installation and having a main component perpendicular to the plane of installation, the definition of the radial and tangential directions remaining unchanged.

It is moreover advantageous, in order to simplify the design of the device, while facilitating the balancing of the stresses and torques, that the various insulation modules of the device of the invention are substantially identical with one another, and/or that the device comprises or consists of three identical modules, placed at the apexes of a preferably equilateral triangle.

But, in order to facilitate the design of the assembly by effect of symmetry, the device may also comprise or consist of four identical modules, placed preferably at the apexes of a square and preferably oriented in a symmetrical manner relative to the diagonals of the square.

Also advantageously, the characteristics of the insulation pads, in terms of section, height, viscoelastic modulus, angles between the longitudinal pads and the mid-plane of the inner part(s), angles between the radial axis of the insulation modules and the plane of installation of the item of equipment, are chosen in order to ensure that the frequency functions of transmissibility of the stresses in force and torque on the three axes to the small movements, below or on the near side of the active position of the flexible abutments, corresponding to a specified template, so that, for example, the low-amplitude vibrations in force and torque transmitted by the item of equipment to the carrying structure are correctly filtered beyond a certain frequency, and that the effective forces and torques generated by the item of equipment are transmitted without harmful damage below said frequency.

Similarly, the characteristics of the flexible abutments, in terms of section, height of elastomer, viscoelastic modulus of the elastomer, dimension of the interstice between the flexible abutment and the facing part, are such that too great a deformation of the insulation pads during heavy loads applied to the device is avoided, thus preventing any deterioration or undesirable irreversible phenomenon, and simultaneously, the frequency functions of transmissibility of the stresses in force and torque on the three axes in the whole range of operation predicted for the device correspond to a specified template, so that the vibrations and impacts of great amplitudes in force and torque transmitted by the carrying structure to the item of equipment are correctly filtered.

The invention also relates to an application of the insulation device as presented above and which is characterized in that the item of equipment is an item of space equipment on board a satellite, said item of equipment comprising at least one rotating portion generating vibrations, such as for example at least one of the following items of equipment: reaction wheel, kinetic wheel, momentum wheel, energy-storage wheel, gyrodyne or gyroscopic actuator or CMG, said item of equipment furnished with its insulation device having to withstand static and dynamic loads such as vibrations, impacts, which it sustains on launch of the satellite.

The application of the insulation device may also be such that said item of space equipment on board a satellite, comprises at least one portion actuated in translation with a movement comprising at least one periodic time component over time generating vibrations, such as for example a compressor used to generate cooler, said item of equipment furnished with its insulation device having to withstand the static and dynamic loads such as vibrations, impacts, that it sustains on launch of the satellite.

BRIEF DESCRIPTION OF THE DRAWINGS

Other features and advantages of the invention will emerge from the description given below, as a nonlimiting description, of exemplary embodiments described with reference to the appended drawings in which:

FIG. 1 is a schematic view of an example of a multi-axis insulation device according to the invention, represented in its entirety, partly in plan and partly in cross section (perpendicularly to the longitudinal axis Z of an item of vibrating equipment) at the upper pads and flexible abutments of each of the four identical insulation modules of this device;

FIGS. 2a and 2b are schematic views in section respectively on IIa-IIa and IIb-IIb of FIG. 1, representing the two outer parts of a module that are fitted respectively with the elastomer insulation pads and the elastomer flexible abutments of this module;

FIG. 3 is a variant embodiment of the module represented in detail III in FIG. 1;

DETAILED DESCRIPTION OF THE DISCLOSURE

Figure 4:
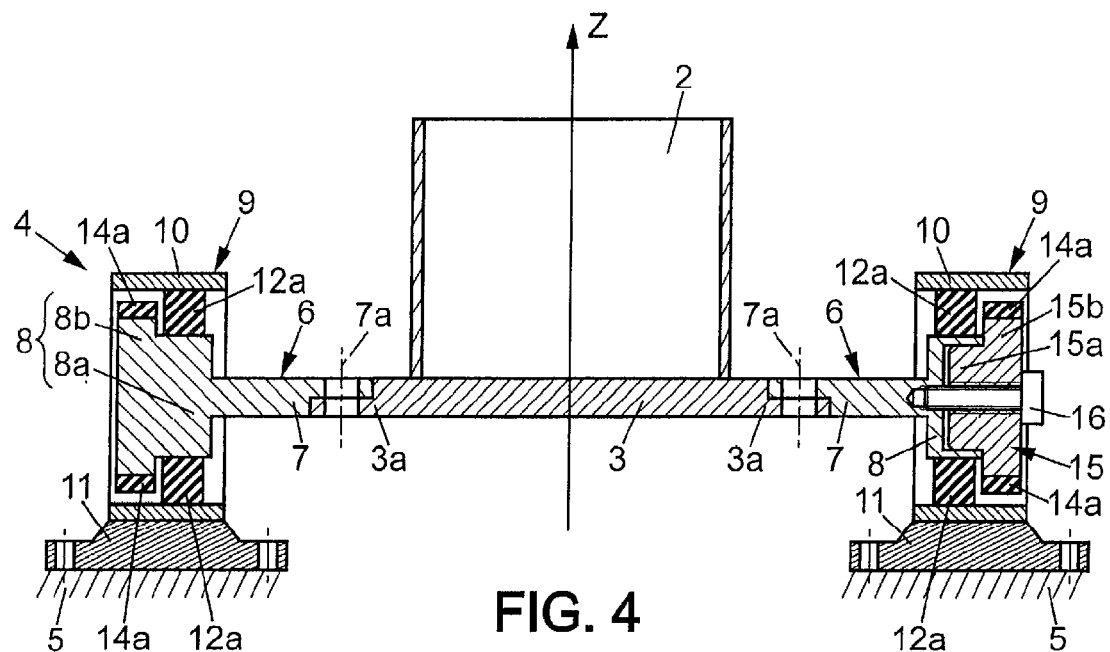
FIG. 4 is a schematic view in longitudinal section passing through the centers of two opposite insulation modules of two variants of the insulation device according to FIG. 1, each variant being represented on one of the half-sections of FIG. 1 respectively.

The multi-axis insulation device 1, shown in its entirety in FIG. 1, is designed to filter vibrations between, on the one hand, an item of vibrating equipment 2 or a set of items of equipment at least one of which is vibrating, represented schematically in FIG. 1 as being of generally cylindrical outer shape of circular section, with a longitudinal axis defined by the direction Z, mounted on an equipment-holding table 3 suspended by four insulation modules 4 identical with one another on a carrying structure 5, and, on the other hand, this carrying structure 5, such as the platform or the inner structure of a service module of a satellite, to which the device 1 is attached by the modules 4 which are simple to design, to produce and install on the periphery of the item of equipment 2 and of the table 3 which supports it. These modules 4 are arranged, relative to the table 3 and to the item of equipment 2, in two pairs of modules 4 diametrically opposed relative to the longitudinal axis Z, and evenly distributed in the circumferential direction about the table 3 so that the four modules 4 are situated and centered at the apexes of a square (represented in dashed lines) and placed symmetrically relative to the two diagonals (D1 and D2) of this square, which are perpendicular to one another and each correspond to the radial direction Y of the two opposite modules 4 of respectively one of the two pairs of modules 4.

As a variant, the multi-axis insulation device may comprise only three identical installation modules 4, evenly distributed on the periphery of the table 3, and preferably placed at the apexes of an equilateral triangle enveloping the table 3 and centered on the axis Z. But an embodiment with four modules 4 according to FIG. 1 gives the advantage of a better symmetry. Moreover, the design of the insulation device 1 is simplified, because the various degrees of freedom in forces and torques are then decoupled and the dimensions are simpler to achieve, because of the modular character of the insulation device 1 and of the structure, particular to the invention, of each insulation module 4, which represents a considerable advantage of the invention relative to the prior art.

Each of the modules 4, independent of the others in its attachment to the carrying structure 5 (schematically represented in FIGS. 2a, 2b, 4 and 5), comprises an inner rigid part 6, extending radially, and of which an inner radial end portion 7 (on the radial axis −YY specific to each module 4, passing through its center and perpendicular to the longitudinal direction Z) is arranged as a rigid, but preferably removable, for example by bolting element 7a, attachment seat, to an attachment flange 3a protruding radially outward from the table 3 in the form of a circular disk. The inner rigid part 6 also has an outer radial end 8 linked to a first outer rigid part 9a of the module 4 by four elastomer insulation pads 12.

This outer part 9a comprises a quadrangular frame 10a, secured to two rectangular lateral seats 11a, each attached to the carrying structure 5 by a screw 13, so that the outer part 9a extends over the structure 5 parallel to the tangential direction X, the thickness of the frame 10a (in the radial direction Y) being generally smaller than its width (in the tangential direction X) and than its height (in the longitudinal direction Z). The frame 10a has a central opening that is also quadrangular (rectangular or square) delimited by two opposite flat faces, perpendicular to the longitudinal direction Z (horizontal faces in FIG. 2a) and two other opposite flat faces perpendicular to the tangential direction X (vertical faces in FIG. 2a) and the section of this central opening in the plane of the directions X-Z is substantially greater than the quadrangular transverse cross section of the outer radial end portion 8, of parallelepipedal shape, which radially traverses the frame 10a.

The four pads 12 are, in this example, identical to one another, and each is in the shape of a parallelepipedal block of elastomer, attached by one of two of its opposite faces against a flat lateral face of the portion 8 and by the other of these two opposite faces against the flat inner face facing the frame 10a, this attachment being provided by vulcanization by molding of the elastomer in situ, by bonding, or by any other equivalent means.

These four pads 12 are thus arranged in a pair of opposite pads called longitudinal pads 12a, because they are acted upon in tension/compression by any stress or stress component in force and/or in torque that is parallel to the longitudinal direction Z, and in a pair of opposite pads called tangential pads 12b, because they are acted upon in tension-compression by any stress or stress component in force and/or in torque which is parallel to the tangential direction X.

The two longitudinal pads 12a are active in opposite directions in the longitudinal direction Z, since one of them is active in compression when the other is active in tension, and conversely (the tangential pads 12b then being acted upon in shear simultaneously in the same direction on Z), and these two pads 12a are mounted on the longitudinal axis –ZZ, substantially symmetrically on either side of the outer radial portion 8 of the inner part 6.

Similarly, the two tangential pads 12b are active in opposite directions in the tangential direction X, since one of them is active in compression when the other is active in tension, and conversely (the longitudinal pads 12a then being acted upon in shearing action simultaneously in the same direction on X), and these two pads 12b are mounted on the tangential axis –XX, also substantially symmetrically on either side of the outer radial portion 8 of the inner part 6.

Each module 4 also comprises a second outer rigid part 9b, with a structure that is identical to that of the first outer part 9a, that is to say comprising a frame 10b and two seats 11b, which are identical respectively to the frame 10a and to the two seats 11a, and also each attached by a screw 13 to the carrying structure 5, in a position parallel and adjacent to the first inner part 9a, but radially outside the part 9a. This second outer part 9b supports four flexible abutments 14 which, in this example, are identical to one another and each consist of an elastomer block of parallelepipedal shape, attached by a flat face, or base, against respectively one of the four inner flat faces of the frame 9b, as shown in FIG. 2b. The thickness of the flexible abutments 14 is such that each abutment 14 has a flat face, opposite to its base, which forms a free end situated facing a respective flat lateral face of the radial end portion 8 of the inner part 6, which is also engaged in the central opening of the frame 9b, but without contact, at rest of this free end of each flexible abutment 14 with the facing face on the portion 8 of the inner part 6.

These four abutments are therefore arranged as a pair of opposite flexible abutments called longitudinal abutments 14a, because they act on the axis of deformation of the longitudinal pads 12a in tension-compression, that is to say in the longitudinal direction Z, and as a pair of opposite flexible abutments called tangential abutments 14b, because they act on the axis of deformation of the tangential pads 12b in tension-compression, that is to say in the tangential direction X.

Therefore, the longitudinal abutments 14a are active on the longitudinal axis –ZZ for one (the abutment 14a in the upper position in FIG. 2b) and in an opposite direction for the other (the abutment 14a in the lower position in FIG. 2b) while limiting the amplitude of the longitudinal movements of the portion 8 of the inner part 6 with the table 3 and the item of vibrating equipment 2 relative to the carrying structure 5 and the second outer part 9b which is secured thereto, by the coming into contact of this portion 8 with the upper or lower longitudinal flexible abutment 14a. Similarly, the tangential abutments 14b are active on the tangential axis –XX for one (the right abutment 14b in FIG. 2b) and in an opposite direction for the other (the left abutment 14b in FIG. 2b) while limiting the amplitude of the tangential movements of the portion 8 of the inner part 6 with the table 3 and the item of vibrating equipment 2 relative to the carrying structure 5 and the second outer part 9b which is secured thereto, by the coming into contact of this portion 8 with the right or left tangential flexible abutment 14b.

As a variant, the elastomer portion 14 of each flexible abutment 14a or 14b may have a greater stiffness than that of the elastomer 12 of the pads 12a or 12b, and/or each flexible abutment 14a or 14b may if necessary have a rigid skeleton, fitted to or integrated into the rigid part 9b which supports it, and supporting at least one layer of elastomer covering this rigid skeleton.

Also as an alternative, not shown in FIGS. 1, 2 and 3 but in other FIGS. (4, 5, etc.), a possible boss on the radial end portion 8 of the inner part 6 which faces the flexible abutments 14 may be introduced in order to reduce the clearance of the flexible abutments, so that the deformations of the insulation pads are not too great when there are major relative movements between the inner and outer parts of the insulation modules.

In normal operation of the item of equipment 2 on the satellite in orbit, the insulation pads 12a and 12b attenuate, through their deformations, the transmission to the structure 5 of the low-amplitude vibrations generated by the item of vibrating equipment 2, without the flexible abutments 14a and 14b coming into contact with the portion 8 of the inner rigid part 6 facing it, while the high-amplitude vibrations generated by impacts and vibrations sustained for example by the carrying structure 5, on launch of the satellite, are limited by the coming into active position of one or other of the longitudinal flexible abutments 14a and tangential abutments 14b, the elastomer block of which comes into contact with the face facing the portion 8 of the inner part 6. In the active position of one and/or the other of the flexible abutments 14a and 14b, the compression of their elastomer element makes it possible to attenuate the transmission of the large-amplitude impacts and vibrations from the carrying structure to the item of equipment 2 on the table 3, during the launch of the satellite in particular. The contact of a flexible abutment 14a or 14b by its elastomer element with the face facing it on the portion 8 of the inner part 6, in the active position, is established only for a sufficient deformation in compression of an insulation pad 12a or 12b, this deformation being greater than the maximum deformations in compression encountered during the normal operation of the item of equipment 2 on the satellite in orbit.

The device 1 thus produced ensures a multi-axis insulation because it comprises at least three, and preferably four, modules 4 thus constituted. Specifically, the longitudinal movements or longitudinal components (on Z) of the movements of the item of vibrating equipment 2 with the table 3 and the inner parts 6 of the modules 4 relative to the carrying structure 5 are attenuated, and possibly limited respectively by the deformations in tension-compression of the longitudinal pads 12a and in shear of the tangential pads 12b of all the modules 4, and, as necessary, by the coming into active position of a flexible abutment 14a of all the modules 4.

The movements in torsion of the item of vibrating equipment 2 and of the table 3 with the inner parts 6 of the modules 4 about the longitudinal direction Z are attenuated by deformation essentially in tension-compression of the tangential pads 12b and the deformation in shear of the longitudinal pads 12a of all the modules 4, with, possibly, the limitation of these torsion movements by the coming into active position of one of the tangential flexible abutments 14b of all the modules 4.

Any movement of the item of equipment 2 and of the table 3 in any radial direction relative to the longitudinal direction Z is divided into two components each of which extends on one respectively of the two diagonals D1 and D2. Therefore, a radial movement stress on D1 acts in shear on the four pads 12 of each of the two modules 4 centered on D1, but is essentially attenuated by the action in tension-compression of the two tangential pads 12b of each of the two modules 4 centered on the diagonal D2, and of which one of the tangential flexible abutments 14b of each can be brought into active position in order to limit the amplitude of the radial movements on D1.

Similarly, the component on D2 of a radial movement of the item of equipment 2 and of the table 3 acts in shear on the pads 12 of the two modules 4 centered on D2, but is essentially attenuated by the action in tension-compression of the tangential pads 12b of the two modules 4 centered on D1, and of which one of the tangential flexible abutments 14b of each can, by coming into active position, limit the amplitude of radial movements on D2, caused by powerful vibrations or impacts.

The tilting stresses and movements of the item of equipment 2 and of the table 3 about any direction in the plane of installation of the item of equipment 2 on the table 3 may be divided into stresses and tiltings about each of the diagonals D1 and D2, the tiltings about D1 being essentially attenuated by the action in tension-compression of the longitudinal pads 12a of the two modules 4 centered on D2, and conversely, the tiltings about D2 are essentially attenuated by the actions in tension-compression of the longitudinal pads 12a of the two modules 4 centered on D1, the other pads being essentially acted on in shear. These tilting movements are limited in amplitude by the coming into active position of one of the longitudinal flexible abutments 14a of the two modules 4 centered on D2 during tiltings about D1, and conversely, the tiltings about D2 may be limited by the coming into active position of one of the longitudinal flexible abutments 14a of each of the two modules 4 centered on D1.

It is understood that the device 1 thus produced clearly constitutes a multi-axis insulation device which allows the resistance to the launch and allows insulation in all the degrees of freedom.

As mentioned in WO 2007/077350, the value of this type of device is to achieve, by virtue of the combined effect of all of the insulation modules, the following three main functions: insulation of vibrations of very low amplitudes between the table 3 and the carrying structure 5 by means of a restricted number of insulation pads, transmission of certain effective torques produced by the item of equipment or set of items of equipment 2 by means of these same pads, and attenuation of high-amplitude impacts and vibrations during the launch phase.

The value of this device relative to the prior art, including WO 2007/077350, is that the transmission of the effective torques possibly produced by the item of equipment 2 on the axes X, Y or Z is made easier because of the greater stiffnesses of the pads operating in all cases in tension/compression rather than in shear. This FIG. 1 makes it possible to easily visualize this effect when torques are generated about the axis Z.

Moreover, the particular disposition of the flexible abutments according to the invention as shown in FIG. 1 provides protection on all the axes in translation and rotation by virtue of the combined effect of the abutments of all four insulation modules, while a single insulation module taken in isolation could in no way withstand the strong relative movements between the table 3 and the carrying structure 2. It is this combined effect of the at least three, and preferably four, modules which makes it possible to considerably simplify the architecture of each module relative to the prior art. FIG. 1 illustrates particularly well this combined effect with respect to the relative movements in translation in the plane of installation of the item of equipment, and the relative movements in rotation about the longitudinal axis.

It can also be understood that, if the available functional interstice, in the rest position, between each of the longitudinal flexible abutments 14a and tangential abutments 14b and the facing face of the portion 8 of the inner part 6 is not adapted to the application of the device, it is easy to unscrew the screws 13 for fastening the seats 11b of the second outer rigid part 9b of one or more of the modules 4 of the device in order to remove this second outer part 9b and replace it with another, of similar structure, but fitted with longitudinal flexible abutments 14a and/or tangential abutments 14b having other dimensions or stiffness, in order to define, at rest, a functional interstice adapted to the envisaged application.

FIG. 3 represents a variant embodiment of the module 4 shown in detail III of FIG. 1. In this variant, the module 4 still comprises an inner rigid part 6, made as described above, and two outer rigid parts 9a and 9b, also made as described above and shown in FIGS. 2a and 2b, but with this difference, relative to each module 4 of FIG. 1, that the second outer part 9b, which supports the four blocks 52 of elastomer 14 forming two longitudinal flexible abutments 14a and two tangential flexible abutments 14b, is situated radially inside the first outer rigid part 9a which is linked to the portion 8 of the inner part 6 by the four pads 12 forming two longitudinal pads 12a and two tangential pads 12b. In this variant, the replacement of the second outer rigid part 9b, in order to replace the flexible abutments 14 with others that are more appropriate, can be carried out only by a complete removal of the module 4, the inner rigid part 6 of which must be separated by unbolting the corresponding flange 3a of the table 3, and of which the two outer rigid parts 9a and 9b must be removed from the carrying structure 5 by unscrewing the screws 13.

In these embodiments, it is advantageous that the two longitudinal pads 12a and/or the tangential pads 12b, of each module 4 are exactly identical with one another in geometry and stiffness, and possibly fitted out, after tests, to balance the device 1.

FIG. 4 represents two variants (one in each half-section) in which the four flexible abutments 14 are supported by an inner rigid part.

In the variant of the left half-section of FIG. 4, there is again, in each module 4, a single inner rigid part 6 which extends radially and the inner radial end portion 7 of which is removably secured to a flange 3a for attachment of the table 3 supporting the item of equipment 2 by bolting elements 7a represented schematically by their fastening axis. In this variant, the outer radial portion 8 of the inner part 6 has two parallelepipedal portions of which one portion 8a, adjacent to the inner radial portion 7 and of smaller cross section, is linked via a shoulder to the parallelepipedal portion 8b of larger transverse cross section and forming the outer radial end of the inner part 6, the two parallelepipedal portions 8a and 8b of which are radially engaged inside the quadrangular frame 10 of a single outer rigid part 9 also comprising a seat 11 for attachment to the carrying structure 5 by screws (not shown). In this variant, the inner rigid part 6 is indeed made in a single piece, a metallic piece for example, which includes its inner radial portion 7 and its outer radial portion 8 consisting of the two parallelepipedal portions 8a and 8b. The inner part 6 is linked to the frame 10 of the outer part 9 by four elastomer insulation pads 12 forming two longitudinal pads 12a and two tangential pads (not visible in this half-section), which are each attached via one of two opposite faces to one of the four lateral faces of the portion 8a, and via the opposite face against the inner flat face facing it in the frame 10, while the four elastomer flexible abutments 14, forming two longitudinal abutments 14a and two tangential abutments (not visible in this half-section), are each attached via one of two opposite faces, forming a base, to one respectively of the four lateral faces of the parallelepipedal portion 8b, the opposite face at the base of each flexible abutment facing, without contact, one respectively of the four inner faces of the frame 10 of the outer part 9, so that the functional interstice is produced, in this variant, between each flexible abutment and a facing face of the outer rigid part 9.

It is understood that the module 4 of this variant operates like the module 4 of the embodiments of FIGS. 1 to 3, when it is associated with at least two other modules in order to form a multi-axis insulation device according to the invention.

This FIG. 4 illustrates particularly well the combined effect of the insulation modules in the matter of the relative movements in translation on the longitudinal axis Z of the item of equipment, and the relative rotary tilting movements of the item of equipment 2. It can be clearly seen that in all cases, the insulation pads will operate mainly in tension/compression which is a favorable element for the application in question.

The variant of the right half-section of FIG. 4 differs from the variant of the left half-section only in that the four flexible abutments 14 are mounted on a second inner rigid part 15, which is mounted in a removable and radially adjustable manner at the end of the outer radial end portion 8 of the first inner rigid part 6, the inner radial end portion 7 of which is attached removably, as in the other variant, to the flange 3a for connecting the table 3, by bolting elements 7a. In this variant, the single outer rigid part 9 is produced as in the variant described above, that is to say that it comprises a single frame 10 placed tangentially and attached to the carrying structure by means of a seat 11 screwed to this structure, the outer radial end portion 8 of the first inner part 6 and the second inner rigid part 15 being radially engaged in the frame 10.

In this variant, the outer radial portion 8 of the first inner part 6 is tubular and opens radially outward in order to receive an inner radial portion 15a of the second inner part 15, which is engaged in the tubular portion 8, while an outer radial portion 15b, with a larger transverse cross section, of the second inner part 15 and of parallelepipedal shape, supports the four flexible abutments 14 symmetrically in twos on its two pairs of opposite faces, and facing and without contact with the four inner flat faces of the frame 10, of which these same inner flat faces are linked via the four elastomer insulation pads 12 to the four outer flat faces of the parallelepipedal outer radial portion of the first inner part 6. The attachment of the second inner part 15 to the first 6 is provided by a radial screw 16 which traverses radially the second inner rigid part 15 and is screwed via the end of its stem into a tapped bore in the bottom of the tubular outer radial portion 8 of the first inner part 6.

Therefore, in order to change the flexible abutments 14, and adjust their stiffness or stiffnesses and/or the functional interstice(s) with the frame 10, it is sufficient to unscrew the screw 16 and to change the second inner rigid part 15 for another fitted with flexible abutments 14 that are better suited to the application of the device.

Figure 5:
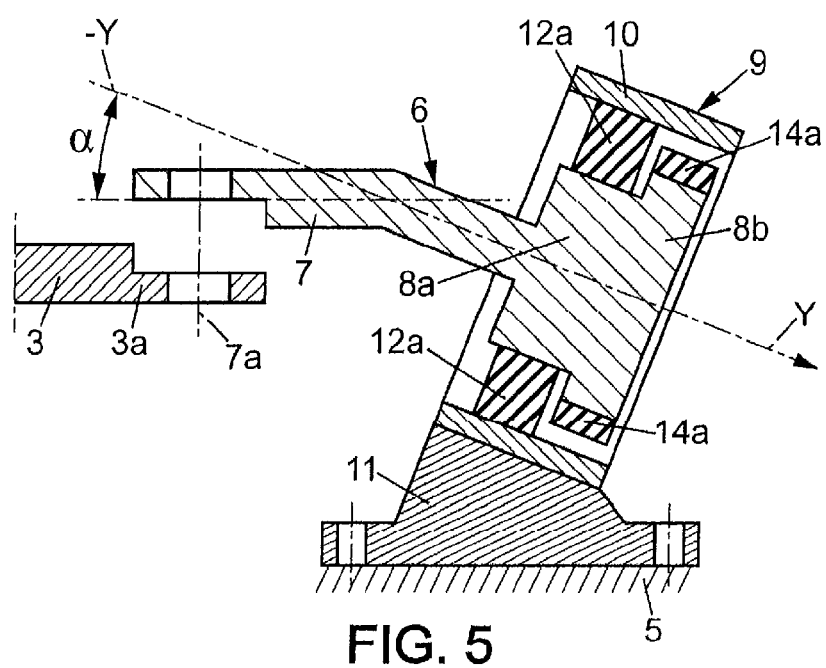
FIG. 5 is a partial schematic view in longitudinal and radial section of a variant of the insulation module, the radial axis of which is inclined on the plane of installation or of suspension of the item of vibrating equipment.

The variant embodiment of FIG. 5 corresponds to that of the left half-section of FIG. 4, but with a single inner rigid part 6 which is bent in its inner radial end portion 7, relative to its outer radial portion 8 having two parallelepipedal portions 8a and 8b the first of which is linked via the pads 12 to the frame of the single outer rigid part 9 and the second supports the flexible abutments 14. Therefore, the radial axis -YY of each insulation module 4 is inclined at one and the same angle α, relative to the plane of installation of the item of vibrating equipment 2 on the table 3, when the inner parts such as 6 are secured via their inner radial portion 7 to a corresponding attachment flange 3a of the table 3 by bolting 7a, as already explained above with reference to FIGS. 1 to 4. In order to allow the removable attachment, by screwing, of the single outer rigid part 9 to the carrying structure 5, while the inner radial portion 7 of the single inner rigid part 6 is attached to the table 3 parallel to the aforementioned plane of installation, the attachment seat 11 of the outer rigid part 9 has a face inclined at the same angle, to which the quadrangular frame 10 of this outer part 9 is attached.

In each of the three variants of FIGS. 4 and 5, the two longitudinal flexible abutments 14a are substantially identical and mounted symmetrically on either side of the outer radial end portion 8b of the single inner part 6 or of the outer radial portion 15b of a second inner rigid part 15, fitted in a removable and radially adjustable manner to a first inner rigid part 6 secured to the table 3 and, similarly, the two tangential flexible abutments, not visible in these figures but like 14b in FIGS. 1 to 3, are substantially identical and mounted substantially symmetrically, on the tangential axis, on either side of this same outer radial end portion 8b of the single inner part 6 or of this same outer radial portion 15b of the second inner rigid part 15 fitted to the first inner part 6.

This principle of using a bent inner part is of benefit for improving the insulation characteristics in certain cases, and it can be applied to all of the variants of the device as described in this descriptive specification.

Figure 6:
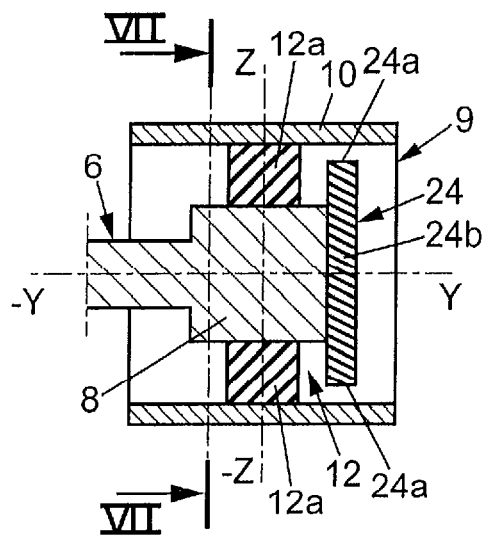
FIG. 6 is a partial schematic view, in longitudinal and radial section, of another variant of an insulation module, all of the flexible abutments of which are of a single elastomer element mounted on the inner rigid part of the module, inside and facing a frame of the rigid outer part of this module.
Figure 7:
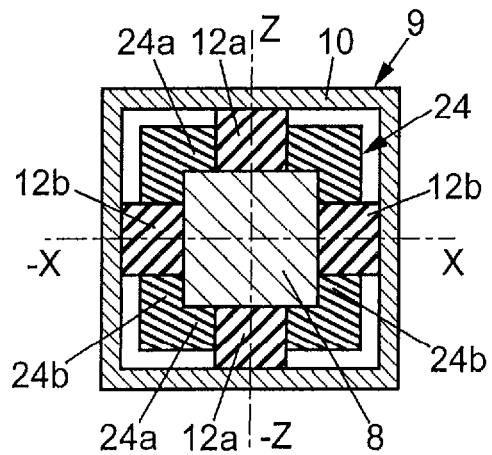
FIG. 7 is a partial schematic view, in tangential section on VII-VII of FIG. 6.

FIGS. 6 and 7 represent partially another variant of the embodiment according to the left half-section of FIG. 4, the representation of which is limited to the quadrangular frame 10 of the single outer rigid part 9, to the outer radial end portion 8 of the single inner rigid part 6, and to the elastomer insulation pads 12 and elastomer flexible abutments.

Again the outer radial portion 8 of the inner part 6 is linked to the frame 10 of the outer part 9 by four elastomer blocks 12 arranged as two longitudinal insulation pads 12a, on the longitudinal axis -ZZ and symmetrical on either side of this outer radial portion 8, and as two tangential insulation pads 12b, on the tangential axis -XX and symmetrical on either side of this outer radial portion 8, as already described in the left half-section of FIG. 4 and in FIG. 5. But the variant of FIGS. 6 and 7 differs from the aforementioned variants in that all of the flexible abutments of each module 4 consist of a single elastomer element 24, having a general outer shape of a rectangular parallelepiped, and which is attached against the outer radial end face of the portion 8 of the inner part 6, hence radially on the outside of the insulation pads 12a and 12b by vulcanization by molding or by bonding in particular, and so that its two opposite sides parallel to the longitudinal axis -ZZ form the two tangential flexible abutments 12b, while its two sides perpendicular to the longitudinal axis −ZZ and radial axis −YY form the two longitudinal flexible abutments 24a.

As in the above examples, each flexible abutment 24a or 24b is separated by a functional interstice, at rest or in the nominal position, from one respectively of the facing four flat inner faces of the frame 10 of the outer part 9.

Figure 8:
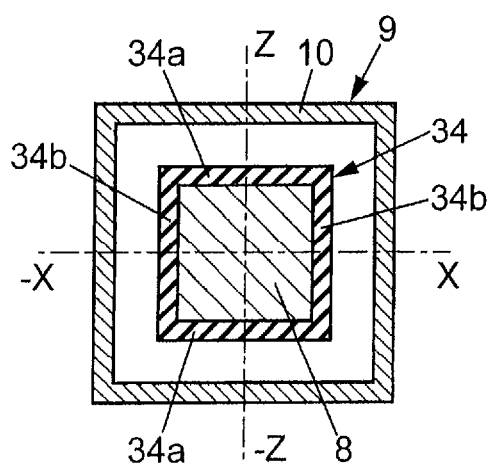
FIG. 8 is a partial schematic view of another variant of a module, in tangential section at the flexible abutments in a single element as an elastomer sleeve surrounding a portion of the inner rigid part of this module, on the inside of and facing a frame of the outer part of this module.

FIG. 8 represents a transverse cross section or tangential section of a variant embodiment according to FIGS. 6 and 7, in which the single elastomer element forming all the flexible abutments of the corresponding module is made in the form of an elastomer sleeve of quadrangular section attached about the outer radial end portion of the portion 8 of the inner part 6, which portion 8 has an outer rectangular parallelepipedal shape with, for example, a square cross section. The inner rigid part 6, of which the portion 8 is therefore fitted with the elastomer sleeve 34 has two longitudinal flexible abutments 34a and two tangential flexible abutments 34b which are thinner than those of the embodiment of FIG. 7 and therefore provide a greater nominal functional interstice with the facing inner faces of the frame 10 of the outer part 9.

Figure 9:
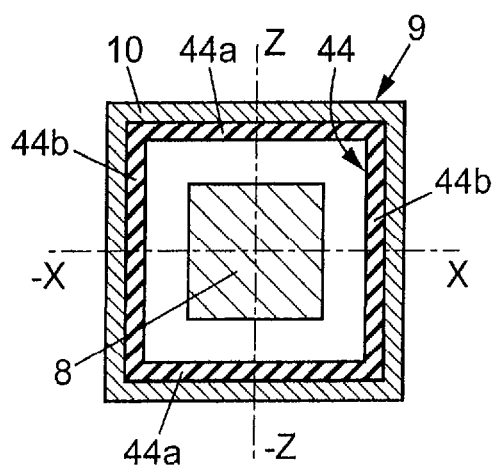
FIG. 9 is a view similar to FIG. 8 of yet another variant of a module, the flexible abutments of which are in a single element as an elastomer sleeve mounted on the inside of the frame of the outer rigid part of the module, facing a portion of the inner rigid part of the module which is engaged in this frame.
Figure 10:
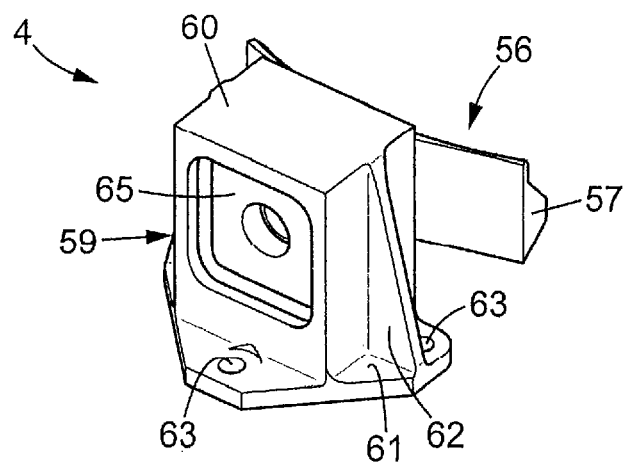
FIG. 10 is a view in perspective of another example of an insulation module, the outer rigid part of which is in one piece.
Figure 11:
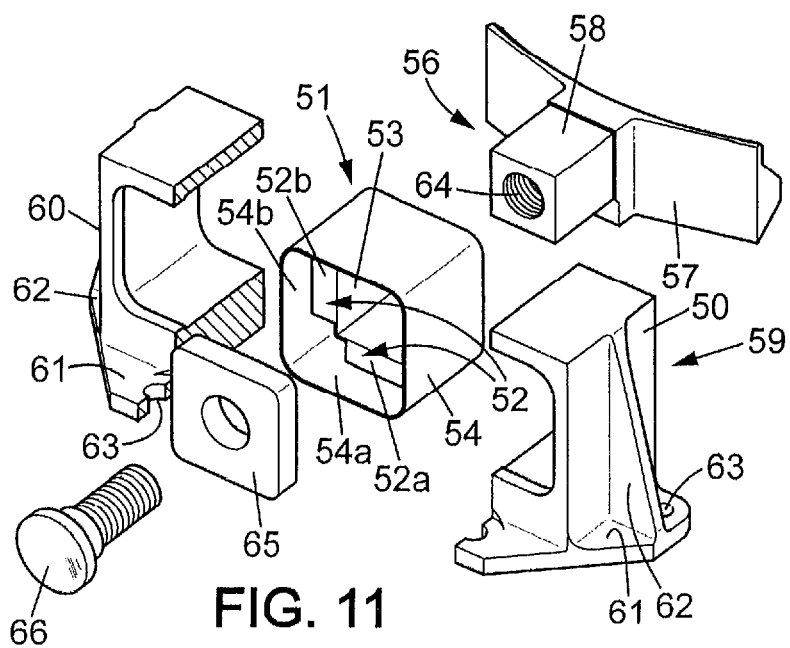
FIG. 11 is an exploded view in perspective of the module of FIG. 10.
Figure 12:
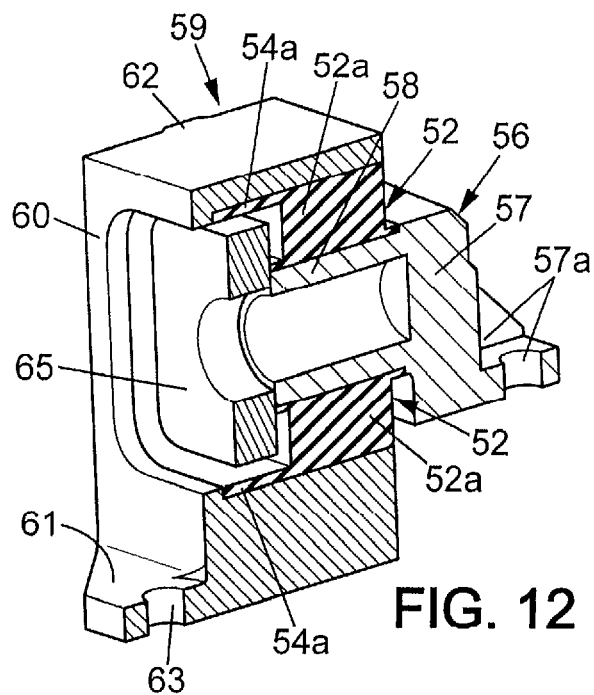
FIGS. 12 and 13 are two views respectively in longitudinal and in cross section, of the module of FIGS. 10 and 11.
Figure 13:
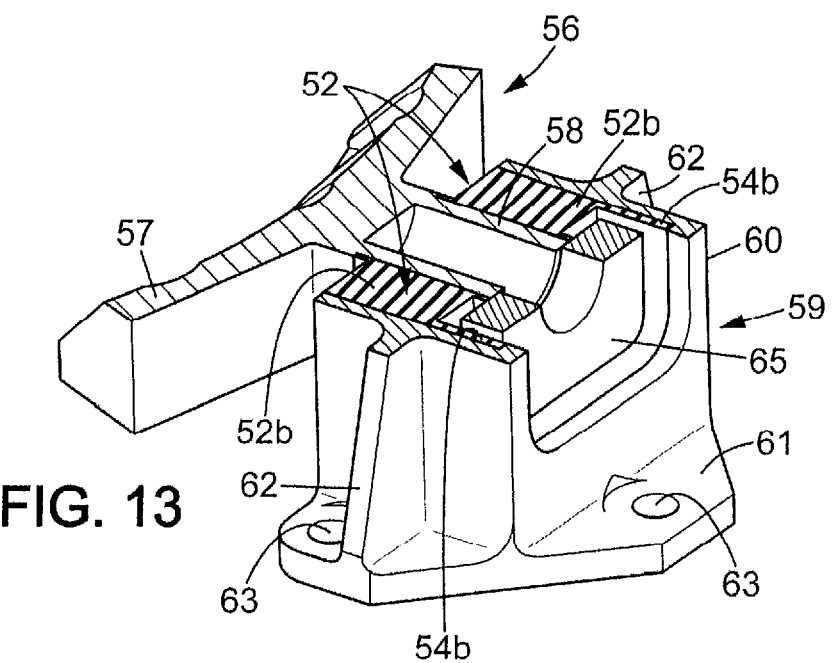

FIG. 9 represents yet another variant, in which the single elastomer element 44, in the shape of a sleeve with a quadrangular transverse cross section and forming all the flexible abutments of a module 4, is secured by its four outer flat faces against the four inner flat faces of the central opening of the frame 10 of the single outer rigid part 9, so that, in this variant, the two longitudinal flexible abutments 44a and the two tangential flexible abutments 44b, formed by the two pairs of opposite sides of the sleeve 44, are supported by the outer part 9, in the frame 10 of which the outer radial end portion 8 of the single inner piece 6 is engaged. In this example, since the thickness of the elastomer sleeve 44 is substantially equal to that of the elastomer sleeve 34 of FIG. 8, the functional interstices between the portion 8 of the inner part 6 and the flexible abutments of the outer part 9 are substantially of the same value as in the example of FIG. 8, assuming that the frame 10 of the outer part 9 and the portion 8 of the inner part 6 have the same dimensions.

Moreover, if the outer radial portion 8 of the inner part 6 has a rectangular or square cross section the two sides of which are greater than the two sides of the similar cross section of the inner part 6 in its portion adjacent to its inner radial portion for attachment to the table 3, the outer radial portion 8 forms a rigid abutment having bosses or forming such bosses by itself, facing the free end of the flexible abutments 44a or 44b facing it, without contact at rest with these flexible abutments, the bosses of which are separated by functional interstices corresponding to the maximum travels of the bosses relative to said flexible abutments 44a, 44b, in order to pass from the rest or nominal position to the active position of said abutments.

In this example, as in the previous examples, the inner part or parts such as 6 and the outer part or parts such as 9 are preferably metallic, made of steel or titanium or titanium alloy for example.

Moreover, it can be noted that the shape of the inner and outer rigid parts could be approximately cylindrical rather than quadrangular or parallelepipedal. In this case, the flexible abutments can consist of an elastomer layer of matching shape, attached either to the inner part (as in FIG. 8) or to the outer part (as in FIG. 9).

The exemplary insulation module 4 of FIGS. 10 to 15 comprises a single outer rigid part 59, comprising a quadrangular frame 60, designed to be positioned and attached tangentially to a carrying structure such as 5, as in the above examples, and made of a single metal part with a seat 61, to which the frame 60 is moreover linked via two lateral stiffening ribs 62, the seat 61 extending over the two sides of the frame 60 and radially toward the outside of the latter, in the operational position, and this seat 61 is pierced with three housings 63 for screws for attachment to the carrying structure.

Figure 14:
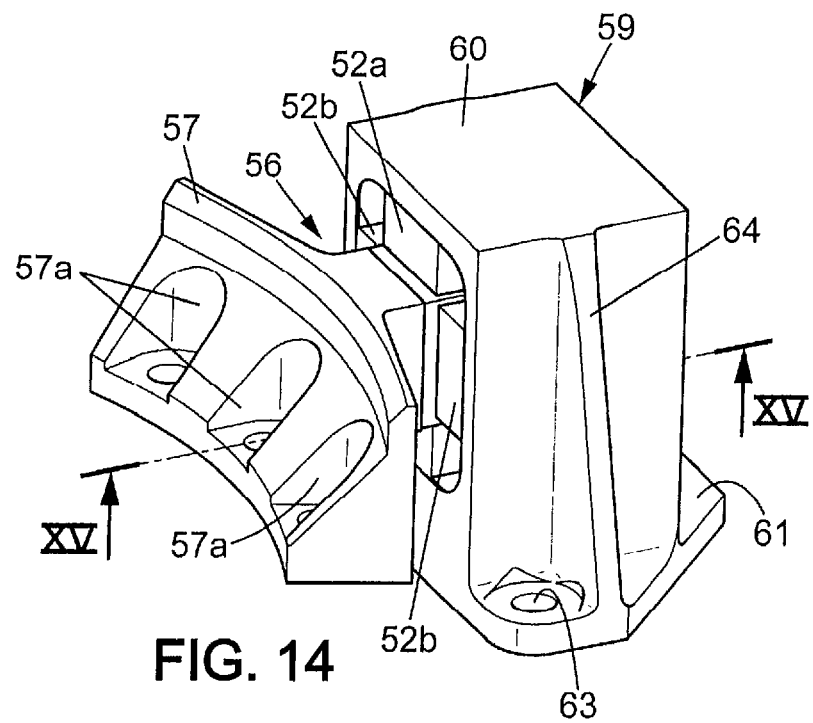
FIG. 14 is another view in perspective of the module of FIGS. 10 to 13.
Figure 15:
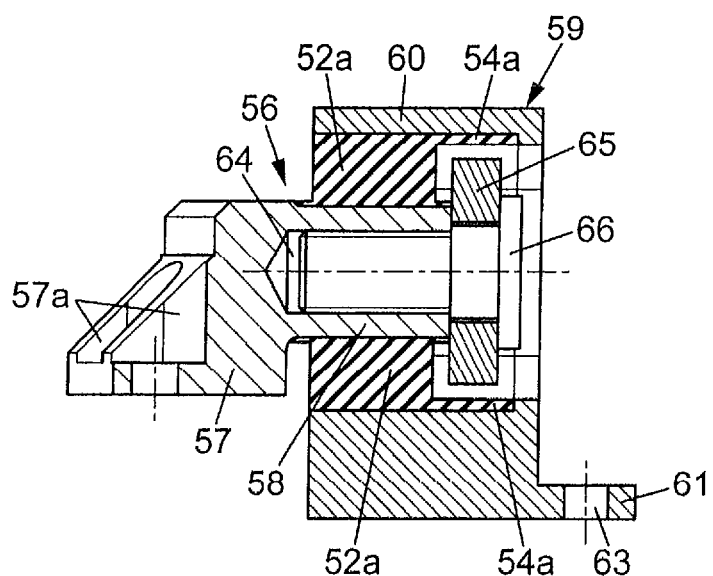
FIG. 15 is a view of the module of FIGS. 10 to 14 in section on XV-XV of FIG. 14.

This exemplary module 4 also comprises a single inner rigid part 56, comprising an inner radial portion 57 arranged as a circularly arcuate seat, for the attachment of the part 56 directly to the edge of an equipment-holding table in the form of a circular disk, such as the table 3 of FIG. 1, but with no radial flange 3a and, for this purpose, this seat 57 has three housings 57a with a pierced bottom, for receiving three screws for attaching the part 56 to the table (see FIGS. 14 and 15). The inner part 56 also comprises an outer radial portion 58, of a single metal part with the portion 57, and arranged as a radial end-piece with a rectangular parallelepipedal outer shape, with a blind and tapped radial bore 64, into which, in an adjustable manner, a retention and fastening screw 66 is screwed, radially on the outside of the radial end-piece 58, of a metal rigid abutment 65, with an outer shape that is also like a rectangular parallelepiped, but flattened and pierced with a central orifice for the screw 66 to pass through. The abutment 65 is therefore mounted in a removable and radially adjustable manner on the inner part 56, and is thus interchangeable.

The assembly of the insulation pads and of the flexible abutments consists of a single elastomer element 51, which externally has the shape of a sleeve 54 of substantially quadrangular cross section, bonded or vulcanized via its four flat outer lateral faces to the four flat inner faces of the frame 60 of the outer part 59, and the thickness of which is sufficient so that, in its outer radial portion, surrounding, without contact at rest, the rigid abutment 65, this sleeve 51 forms the two longitudinal opposite flexible abutments 54a and the two opposite tangential flexible abutments 54b (see FIGS. 11 to 13 and 15), while the inner radial portion of this sleeve 54 is linked via four parallelepipedal blocks 52, that are identical and opposite in twos, to an inner sleeve 53, also of substantially quadrangular cross section, thinner than the outer sleeve 54, and secured mechanically or by bonding via its four inner flat faces to the four outer flat lateral faces of the radial end-piece 58, thus surrounded and which is engaged in the frame 60 of the outer part 59. Therefore, the four elastomer blocks 52 linking together the inner sleeve 53 and outer sleeve 54 consist of two opposite and longitudinal insulation pads 52a and two opposite and tangential insulation pads 52b, as shown in FIGS. 11 to 13 and 15, the sections 12 and 15, on the one hand, and the section 13 on the other hand, representing more particularly and respectively the longitudinal pads 52a and longitudinal flexible abutments 54a, on the one hand, and on the other hand the tangential pads 52b and tangential flexible abutments 54b.

It is understandable that the interchangeability of the rigid abutment 65 makes it possible to adjust the functional interstices between two of its opposite sides and the two longitudinal flexible abutments 54a and between its two other opposite sides and the two tangential flexible abutments 54b. This interchangeability also makes it possible to adjust the thickness of this abutment 65, and its adjustable radial positioning relative to the radial end-piece 58 makes it possible to position it appropriately relative to the flexible abutments 54a and 54b.

The operation of this device is the same as that of the preceding examples, and similarly the production of the elastomer insulation pads and flexible abutments can be achieved by molding the elastomer, after surface treatment of the metal portions in order to ensure the elastomer-metal adhesion, between the two parts, the inner part 56 and outer part 59, by using cores or covers to fill the volumes that are not to be occupied by the elastomer, in particular around the abutment 65, and between this abutment 65 and the four pads 52. The removable mounting of this abutment 65 makes it easier to remove these cores or covers after the molding of the elastomer which is attached by vulcanization to the corresponding and prepared surfaces of the inner rigid part 56 and outer rigid part 59.

In this example also, note that the edges of the rigid abutment 65 consist of metal bosses facing the flexible abutments 54a, 54b with which these bosses delimit the functional interstices allowing the passage from the rest position to the active positions of the flexible abutments, in order to limit and filter the large-amplitude vibrations, while the micro-vibrations are attenuated and filtered by the insulation pads 52a and 52b.

It can also be noted that, in a variant of the device (not shown in FIGS. 12 to 15), there is no join between the insulation pads and the flexible abutments (cores being able to be placed between the two), either because different elastomers are used to produce the pads and the abutments, or because it is desired to prevent possible dynamic interactions between the pads and the abutments.

For all these variant embodiments of the invention, the shape or shapes of the insulation pads 12 and 52 and/or of the flexible abutments 14, 24, 34, 44 and 54 can be chosen without too many constraints, the preferred shapes being parallelepipedal or cylindrical for reasons of simplicity and of linearity for small movements, but frustoconical or pyramidal shapes are possible. Similarly, each pad and/or flexible abutment can be in a single piece made of elastomer, or laminated, for example with several layers of elastomer of different stiffnesses, the elastomer of the pads and flexible abutments being able to be the same, or of different elastomers.

For each of these variants, the characteristics of the insulation pads such as 12, in terms of cross section, height, viscoelastic modulus, angles between the longitudinal pads 12a and the mid-plane of the inner part(s) 6, angles between the radial axis of the insulation modules and the installation plane of the item of equipment 2, are chosen in order to ensure that the frequency functions of transmissibility of the stresses in force and torque on the three axes for small movements (below the point of operation of the flexible abutments such as 14) correspond to a specified template, so that, for example, the low-amplitude vibrations in force and torque transmitted by the item of equipment 2 to the structure 5 of the satellite are correctly filtered above a given frequency, and that the effective forces and torques generated by the item of equipment 2 are transmitted without harmful deterioration below said given frequency.

Similarly, the characteristics of the flexible abutments, such as 14, in terms of cross section and height of elastomer, viscoelastic modulus of the elastomer, dimension of the interstice between the elastomer of the flexible abutment and the rigid part facing it at rest, are chosen such that too great a deformation of the insulation pads, such as 12, when heavy loads are applied to the device is avoided, thus preventing any damage or undesirable irreversible phenomenon, and at the same time, the frequency functions of transmissibility of the stresses in force and torque on the three axes in the whole range of operation provided for the device correspond to a specified template, so that the large-amplitude vibrations and impacts in force and torque transmitted by the structure 5 of the satellite to the item of equipment 2 are correctly filtered.

It should be noted that, in order to make the manufacture of the insulation modules 4 easier, it is very advantageous to use the same type of elastomer for the insulation pads 12, 52 and the flexible abutments 14, 24, 34, 44 and 54.

It is also possible to produce the inner parts 6 or 56 of the insulation modules 4 so that these parts form a body with the item of equipment 2 or the equipment-holding table 3, which makes the device less modular, but allows more compactness (specification of allocatable volume) and integrability.

If needed, at least some of the embodiments of the device of the invention make it possible to carry out various adjustments: functional interstice between each flexible abutment and the facing portion of the or one inner or outer rigid part of the corresponding module, this interstice being able to be differentiated depending on the longitudinal or tangential direction, or even depending on the orientations in each direction, and/or stiffness of the flexible abutments, by choice of the elastomer(s) and/or of the structure of the flexible abutments, which may also be differentiated depending on the longitudinal and tangential directions, or depending on the orientations of these directions.

The invention claimed is:

1. A device for a multi-axis insulation of at least one item of equipment that generates vibrations on board a carrying structure, comprising at least three insulation modules distributed on the periphery of said item of vibrating equipment or of a support of said item, each insulation module comprising at least two rigid parts at least one of which, called outer part is designed to be attached to said carrying structure, and of which at least one other, called inner part, is designed to be attached to said item of vibrating equipment or to said support, said inner part extending along a radial axis, at least one inner part and at least one outer part being connected to one another by at least one elastomer insulation pad attenuating by deformation of said at least one insulation pad the transmission of low-amplitude vibrations generated by said item of equipment, each module also comprising at least two flexible abutments mounted on at least one inner part or on at least one outer part, and each abutment having a free end facing another part, respectively outer part or inner part, and with no contact with said other part at rest, each of said at least two flexible abutments acting on at least one axis of deformation of said at least one insulation pad and two of said flexible abutments, called longitudinal abutments, being active on longitudinal axis perpendicular to the radial axis, in opposite directions, wherein each insulation module also comprises two other flexible abutments, called tangential abutments, that are active along a tangential axis perpendicular to the radial axis and to the longitudinal axis, in opposite directions along the tangential axis.

2. The insulation device as claimed in claim 1, wherein each of said flexible abutments of said insulation modules comprise at least one elastomer element coming into contact with said other rigid part facing said flexible abutment, in the active position of said flexible abutment.

3. The insulation device as claimed in claim 2, wherein said elastomer element of at least one flexible abutment of at least one insulation module has a free end facing said other outer or inner part, and with no contact at rest with said other part, which comprises a portion facing said elastomer element and consisting of a metal portion of said other part.

4. The insulation device as claimed in claim 1 wherein, at least one insulation module comprises one at least of a insulation pad, called a tangential pad, mounted substantially on the tangential axis, and another insulation pad, called a longitudinal pad, mounted substantially on the longitudinal axis.

5. The insulation device as claimed in claim 4, at least one insulation module comprises two longitudinal insulation pads, mounted substantially symmetrically on either side of an inner part of said module on the longitudinal axis, and/or two tangential insulation pads, mounted substantially symmetrically on either side of an inner part of said module on the tangential axis.

6. The insulation device as claimed in claim 1 wherein, on at least one module, said two longitudinal flexible abutments, are mounted substantially symmetrically on either side of an inner part on the longitudinal axis, and said two tangential flexible abutments, are mounted substantially symmetrically on either side of said inner part on the tangential axis.

7. The insulation device as claimed in claim 1 wherein all of said, flexible abutments of at least one module consist of a single elastomer element attached to one of at least one of inner rigid part and at least one outer rigid part, facing another respectively outer or inner rigid part.

8. The insulation device as claimed in claim 1 wherein, all of said insulation pads and of said flexible abutments of at least one module consist of a single elastomer element.

9. The insulation device as claimed in claim 1 wherein, at least one module comprises two outer rigid parts, of which one supports all said flexible abutments, and the other is connected by said at least one insulation pad to one inner rigid part of said module said, flexible portion of said flexible abutments being attached either to an inner face of said outer rigid part supporting all said flexible abutments, or to the outer face of one inner rigid part.

10. The insulation device as claimed in claim 9, wherein said outer part supporting said flexible abutments is removably attached to said carrying structure, in an outer radial position relative to said other outer part of said module.

11. The insulation device as claimed in claim 1 wherein, on at least one module, a first inner part is attached to said item of vibrating equipment or to said support, and is linked via said at least one insulation pad to one outer part of said module, and all said flexible abutments are supported by a second inner part attached in a removable and positionally adjustable manner to said first inner part, said, flexible portion of said flexible abutments being attached either to an inner face of one outer part, or to an outer face of said second inner rigid part.

12. The insulation device as claimed in claim 11, wherein said-flexible abutments are supported on or about an outer radial end of said second inner part arranged as a radial end-piece which partially fits, removably and with a radial adjustment, in said first inner part linked via said at least one pad to a frame of one outer part in which said first inner part and second inner part are engaged radially.

13. The insulation device as claimed in claim 1 wherein, on at least one module, said flexible portions of the flexible abutments are attached to one and the same inner part and consist of a single elastomer element attached to or about an outer radial end portion of said inner part and engaged, without contact at rest, in a frame of matching shape of at least one outer part.

14. The insulation device as claimed in claim 1 wherein, on at least one module said, flexible portions of said flexible abutments are attached to one and the same outer part and consist of a single elastomer element in the shape of a sleeve attached via an outer face of said sleeve to an inside of a frame of said outer part, and surrounding, without contact at rest, a rigid abutment of matching shape mounted on a radial end-piece of an inner part, protruding radially outward and engaged in said frame of said outer part.

15. The insulation device as claimed in claim 14, wherein said rigid abutment is interchangeable and is attached in a removable and adjustable manner, to an outer radial end of said radial end-piece of said inner part.

16. The insulation device as claimed in claim 1, wherein each of said insulation modules has a radial axis inclined at one and the same angle relative to a plane of installation of said item of vibrating equipment on an equipment-holding table to which said inner parts of said modules are secured.

17. The insulation device as claimed in claim 1, comprising three identical insulation modules.

18. The insulation device as claimed in claim 1, comprising four identical modules placed at the apexes of a square and oriented symmetrically relative to the diagonals of the square.

19. The insulation device as claimed in claim 1, wherein characteristics of said insulation pads, in terms of section, height, viscoelastic modulus, angles between said longitudinal pads and a mid-plane of said inner part, angles between a radial axis of said insulation modules and a plane of installation of said item of equipment, are chosen in order to ensure that frequency functions of transmissibility of the stresses in force and torque on the three axes for small movements, below the active position of said flexible abutments, correspond to a specified template, so that low-amplitude vibrations in force and torque transmitted by said item of equipment to said carrying structure are correctly filtered beyond a certain frequency, and that effective forces and torques generated by said item of equipment are transmitted without harmful deterioration below said frequency.

20. The insulation device as claimed in claim 1, wherein characteristics of said flexible abutment, in terms of section, height of elastomer, viscoelastic modulus of elastomer, dimension of an interstice between a flexible abutment and a facing part, are such that too great a deformation of said insulation pads during heavy loads applied to the device is avoided, thus preventing any damage or undesirable irreversible phenomenon, and simultaneously, frequency functions of transmissibility of stresses in force and torque on the three axes in the whole range of operation predicted for the device correspond to a specified template, so that the vibrations and impacts of great amplitudes in force and torque transmitted by said carrying structure to said item of equipment are correctly filtered.

21. The insulation device as claimed in claim 1, wherein said item of equipment is an item of space equipment on board a satellite, said item of equipment comprising at least one rotating portion generating vibrations selected in the group comprising at least one reaction wheel, one kinetic wheel, one momentum wheel, one energy-storage wheel, and one CMG said item of equipment and the insulation device having to withstand static and dynamic loads which are sustained on launch of the satellite.

22. The insulation device as claimed in claim 1, wherein said item of equipment is an item of space equipment on board a satellite, said item of equipment comprising at least one portion actuated in translation with a movement comprising at least one periodic time component over time generating vibrations, a compressor used to generate cooler, said item of equipment and the furnished with its insulation device having to withstand static and dynamic loads that are sustained on launch of the satellite.

23. The insulation device as claimed in claim 21, wherein it insulates a set of items of equipment at least one item of which is disruptive, all mounted on one and the same equipment-holding table.

24. The insulation device as claimed in claim 21, wherein it insulates a portion of a satellite including a service module with respect to another portion of the satellite including a payload.

* * * * *